(12) United States Patent
Wang

(10) Patent No.: US 12,079,009 B2
(45) Date of Patent: Sep. 3, 2024

(54) UNMANNED AERIAL VEHICLE RIDING ROUTE PROCESSING METHOD, APPARATUS AND DEVICE, AND READABLE STORAGE MEDIUM

(71) Applicants: BEIJING JINGDONG SHANGKE INFORMATION TECHNOLOGY CO., LTD., Beijing (CN); BEIJING JINGDONG CENTURY TRADING CO., LTD., Beijing (CN)

(72) Inventor: Kaibin Wang, Beijing (CN)

(73) Assignees: BEIJING JINGDONG SHANGKE INFORMATION TECHNOLOGY CO., LTD., Beijing (CN); BEIJING JINGDONG CENTURY TRADING CO., LTD., Beijing (CN)

( * ) Notice: Subject to any disclaimer, the term of this patent is extended or adjusted under 35 U.S.C. 154(b) by 293 days.

(21) Appl. No.: 17/516,385

(22) Filed: Nov. 1, 2021

(65) Prior Publication Data
US 2022/0057814 A1 Feb. 24, 2022

Related U.S. Application Data

(63) Continuation of application No. PCT/CN2020/080154, filed on Mar. 19, 2020.

(30) Foreign Application Priority Data

May 28, 2019 (CN) .......................... 201910452768.5

(51) Int. Cl.
*G05D 1/00* (2006.01)
*B64C 39/02* (2023.01)
(Continued)

(52) U.S. Cl.
CPC ........... *G05D 1/101* (2013.01); *B64C 39/024* (2013.01); *G01C 21/20* (2013.01); *G05D 1/12* (2013.01); *B64U 80/86* (2023.01); *B64U 2201/10* (2023.01)

(58) Field of Classification Search
CPC ........ G05D 1/101; G05D 1/12; G05D 1/0005; B64C 39/024; G01C 21/20; B64U 80/86;
(Continued)

(56) References Cited

U.S. PATENT DOCUMENTS 9,809,305 B2 * 11/2017 Buchmueller ........ B64C 39/024
10,175,042 B2 1/2019 Diem et al.
(Continued)

FOREIGN PATENT DOCUMENTS

CN 107506959 A 12/2017
CN 108230754 A 6/2018
(Continued)

OTHER PUBLICATIONS

The Extended European Search Report for European Patent Application No. 20812904.9, dated Dec. 2, 2022.
(Continued)

*Primary Examiner* — Abdalla A Khaled

(57) ABSTRACT

An unmanned aerial vehicle riding route processing method, apparatus and device, and a readable storage medium, the method includes: determining candidate ride vehicles according to an autonomous flight route of an unmanned aerial vehicle from a flight start point to a flight destination; determining a riding flight route of the unmanned aerial vehicle according to current locations of the candidate ride vehicles; and controlling the unmanned aerial vehicle to ride at least one of the candidate ride vehicles to travel from the flight start point to the flight end point according to the riding flight route.

15 Claims, 4 Drawing Sheets

(51) Int. Cl.
*G01C 21/20* (2006.01)
*B64U 80/86* (2023.01)

(58) Field of Classification Search
CPC ...... B64U 2201/10; G08G 1/20; G08G 1/207; G08G 5/0034; G08G 5/0043; G08G 5/006; G08G 5/0069; G06Q 10/083
See application file for complete search history.

(56) References Cited

U.S. PATENT DOCUMENTS

| | | | |
|---|---|---|---|
| 10,287,014 B2* | 5/2019 | Erickson | B64D 27/24 |
| 2016/0196756 A1* | 7/2016 | Prakash | G06Q 10/083 701/3 |
| 2016/0257401 A1* | 9/2016 | Buchmueller | G06Q 50/28 |
| 2017/0160735 A1* | 6/2017 | Mikan | G08G 5/0069 |
| 2018/0037322 A1* | 2/2018 | Buchmueller | G06Q 10/047 |
| 2018/0165973 A1 | 6/2018 | Chun | |
| 2019/0043000 A1* | 2/2019 | Wang | G06Q 10/083 |
| 2019/0220819 A1* | 7/2019 | Banvait | G06Q 10/08355 |
| 2019/0244530 A1* | 8/2019 | Chun | B64C 39/024 |
| 2019/0295426 A1* | 9/2019 | Nilsson | G08G 5/0069 |
| 2020/0191581 A1* | 6/2020 | Chun | B64U 50/37 |
| 2020/0286033 A1* | 9/2020 | Ur | G08G 5/0034 |
| 2020/0356114 A1* | 11/2020 | Uçar | G08G 5/0013 |

FOREIGN PATENT DOCUMENTS

| | | |
|---|---|---|
| CN | 109415122 A | 3/2019 |
| CN | 109532911 | 3/2019 |
| JP | 2018-513456 A | 5/2018 |
| WO | 2017/138922 A1 | 8/2017 |
| WO | 2018/065977 A1 | 4/2018 |
| WO | 2019/078815 A1 | 4/2019 |

OTHER PUBLICATIONS

The Notice of Reasons for Refual for Japanese Patent Application No. 2021-563657, dated Oct. 31, 2022.
International Search Report dated Jun. 15, 2020 for International Patent Application No. PCT/CN2020/080154.

* cited by examiner

UNMANNED AERIAL VEHICLE RIDING ROUTE PROCESSING METHOD, APPARATUS AND DEVICE, AND READABLE STORAGE MEDIUM

CROSS-REFERENCE TO RELATED APPLICATIONS

This application is a continuation of International Application No. PCT/CN2020/080154, filed on Mar. 19, 2020, which claims priority to Chinese Patent Application No. 201910452768.5, entitled "UNMANNED AERIAL VEHICLE RIDING ROUTE PROCESSING METHOD, APPARATUS AND DEVICE, AND READABLE STORAGE MEDIUM", filed on May 28, 2019, both of the above applications are hereby incorporated by reference in their entireties.

TECHNICAL FIELD

Embodiments of the present application relate to the field of unmanned aerial vehicle technologies, and in particular, to an unmanned aerial vehicle riding route processing method, apparatus and device and a readable storage medium.

BACKGROUND

With the development of unmanned aerial vehicle technologies, unmanned aerial vehicles have begun to be used in the field of logistics. At present, an unmanned aerial vehicle relies on its own power to fly from a start point to a destination according to an established flight route for delivery of packages.

SUMMARY

Embodiments of the present application provide an unmanned aerial vehicle riding route processing method, apparatus and device and a readable storage medium.

One aspect of the embodiments of the present application provides an unmanned aerial vehicle riding route processing method, including:
  determining candidate riding vehicles according to an autonomous flight route of an unmanned aerial vehicle from a flight start point to a flight end point;
  determining a riding flight route of the unmanned aerial vehicle according to current locations of the candidate riding vehicles; and
  controlling the unmanned aerial vehicle to ride at least one of the candidate riding vehicles according to the riding flight route.

Another aspect of the embodiments of the present application provides an unmanned aerial vehicle riding route processing apparatus, including:
  a vehicle selecting module, configured to determine candidate riding vehicles according to an autonomous flight route of an unmanned aerial vehicle from a flight start point to a flight end point;
  a riding route calculating module, configured to determine a riding flight route of the unmanned aerial vehicle according to current locations of the candidate riding vehicles; and
  a riding controlling module, configured to control the unmanned aerial vehicle to ride at least one of the candidate riding vehicles according to the riding flight route.

Another aspect of the embodiments of the present application provides an unmanned aerial vehicle riding route processing device, including:
  a memory, a processor, and a computer program stored in the memory and executed by the processor,
  when the processor executes the computer program, the unmanned aerial vehicle riding route processing method above is implemented.

Another aspect of the embodiments of the present application provides a computer-readable storage medium, having a computer program stored thereon, when the computer program is executed by a processor, the unmanned aerial vehicle riding route processing method above is implemented.

Figure 1:
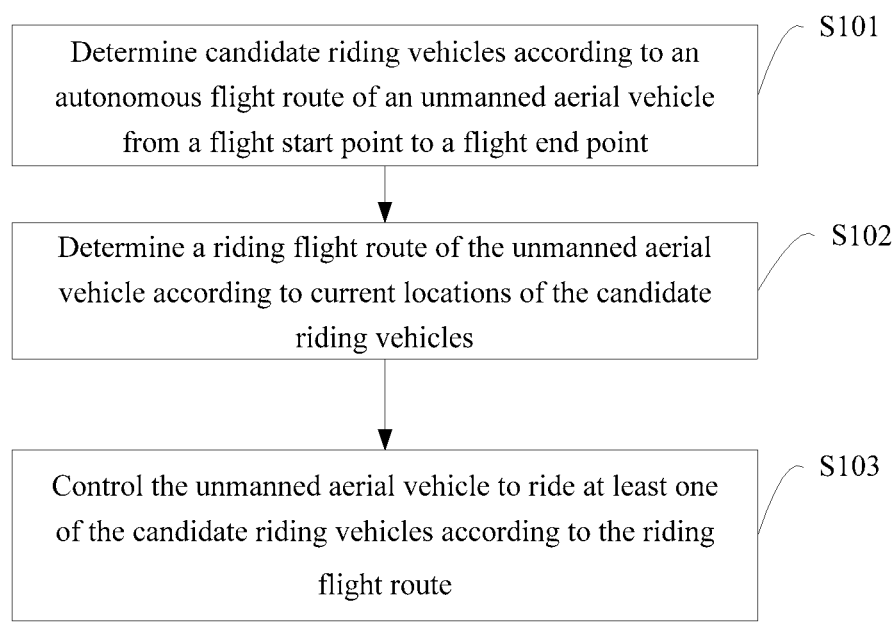
FIG. 1 is a flowchart of an unmanned aerial vehicle riding route processing method provided by an embodiment of the present application.

Through the above drawings, the specific embodiments of the present disclosure have been shown, which will be described in detail below. These drawings and text description are not intended to limit the scope of the conception of embodiments of the present application in any way, but to explain the concept of the present application to those skilled in the art by referring to specific embodiments.

DESCRIPTION OF EMBODIMENTS

Illustrative embodiments will be described in detail here, and examples thereof are shown in the accompanying drawings. When the following description refers to the drawings, unless otherwise indicated, the same numbers in different drawings indicate the same or similar elements. The implementations described in the following illustrative embodiments do not represent all implementations consistent with the embodiments of the present application. On the contrary, they are merely examples of apparatuses and methods consistent with some aspects of the present application as detailed in the appended claims.

First, the terms involved in the embodiments of the present application are explained.

Geo-fencing (Geo-fencing) is a new application of Location Based Service (LBS), which uses a virtual fence to enclose a virtual geographic boundary. When a mobile terminal such as a mobile phone enters, leaves, or moves in the geographic area within the geo-fencing, the mobile terminal can receive an automatic notification and warning information.

POI: the abbreviation of "Point of Interest". In a map, a POI may be a house, a shop, a mailbox, a bus stop, etc.

A directed line segment refers to a line segment with a specified direction. The direction of the directed line segment is a direction from one point to another point, the two end points of the directed line segment are in order. We call the preceding point as a start point of the directed line segment, and call the other point as an end point of the directed line segment.

In addition, the terms "first", "second", etc. are only used for descriptive purposes, and cannot be understood as indicating or implying relative importance or implicitly indicating the number of indicated technical features. In the description of the following embodiments, "multiple" means two or more, unless otherwise specifically defined.

The following specific embodiments can be combined with each other, and the same or similar concepts or processes may not be repeated in some embodiments. The embodiments of the present application will be described below in conjunction with the accompanying drawings.

With the development of unmanned aerial vehicle technologies, unmanned aerial vehicles have begun to be used in the field of logistics. At present, an unmanned aerial vehicle relies on its own power to fly from a start point to a destination according to an established flight route for delivery of packages.

However, usual delivery routes are long and battery capacity of the unmanned aerial vehicle is limited. A distance that the unmanned aerial vehicle can fly relying on its own power is short, so that the unmanned aerial vehicle cannot complete one-way or round-trips of some long delivery routes.

Embodiments of the present application provide an unmanned aerial vehicle riding route processing method, apparatus and device and a readable storage medium, which are used to solve the problem of a short distance that an unmanned aerial vehicle can fly relying on its own power due to limited battery capacity of the unmanned aerial vehicle in the related art.

FIG. 1 is a flowchart of an unmanned aerial vehicle riding route processing method provided by an embodiment of the present application. The embodiment of the present application provides an unmanned aerial vehicle riding route processing method, aiming at the problem of the short distance that the unmanned aerial vehicle files relying on its own power due to limited battery capacity of the unmanned aerial vehicle in the related art. The method in the embodiment is applied to an unmanned aerial vehicle riding route processing device, the unmanned aerial vehicle riding route processing device may be an unmanned aerial vehicle, an unmanned aerial vehicle control device, or may also be a server for flight control and management of an unmanned aerial vehicle, etc. In other embodiment, the method may also be applied to other devices. In the embodiment, the unmanned aerial vehicle riding route processing device is used as an example for schematic illustration. As shown in FIG. 1, the specific steps of the method are as follows.

Step S101: determine candidate riding vehicles according to an autonomous flight route of an unmanned aerial vehicle from a flight start point to a flight end point.

In the embodiment, first acquiring an autonomous flight route of an unmanned aerial vehicle from a flight start point to a flight end point when the unmanned aerial vehicle has not ridden any vehicle. The embodiment may be applied to an itinerary of the unmanned aerial vehicle to delivery items or a return itinerary after the unmanned aerial vehicle has delivered the items to a destination.

Where the flight start point is a take-off location of the unmanned aerial vehicle, and the flight end point is a destination of the unmanned aerial vehicle.

Optionally, the flight start point and the flight end point may be expressed in the form of POI. For example, the flight start point may be a start point POI determined based on the latitude and longitude of a location before the unmanned aerial vehicle takes off, and the flight ending point may be an end point POI determined based on the latitude and longitude of an unmanned aerial vehicle site corresponding to a delivery address of the unmanned aerial vehicle.

After the autonomous flight route of the unmanned aerial vehicle is determined, an area within a specified width on both sides of the autonomous flight route of the unmanned aerial vehicle may be taken as a specific geographic area according to the autonomous flight route of the unmanned aerial vehicle, so as to determine a geo-fencing corresponding to the autonomous flight route of this time; and further, vehicles whose travelling speeds meet a preset condition are selected from vehicles whose travelling routes are at least partly within the geo-fencing as candidate riding vehicles.

Where the specified width may be calculated according to the autonomous flight route of this time, or the specified width may be set by a technician according to actual application scenarios, which is not specifically limited in the embodiment.

For example, the specified width may be a preset scale parameter multiplied by a length of the autonomous flight route, where the preset scale parameter may be set by a technician according to actual application scenarios, which is not specifically limited in the embodiment.

Where the preset condition that the travelling speed meets is used to restrict the travelling speed of the vehicle from being too fast or too slow, and may be set by a technician according to actual application scenarios and empirical values, which is not specifically limited in this embodiment.

In addition, after the autonomous flight route of the unmanned aerial vehicle from the flight start point to the flight end point is determined, the flight start point, the flight end point, and the autonomous flight route may also be displayed on the electronic map.

Step S102: determine a riding flight route of the unmanned aerial vehicle according to current locations of the candidate riding vehicles.

After the candidate riding vehicles are determined, a riding flight route of the unmanned aerial vehicle may be determined according to current locations of the candidate riding vehicles.

Exemplarily, another feasible implementation of this step is:

calculating distances between the candidate riding vehicles and the flight start point of the unmanned aerial vehicle; using the current locations of the candidate riding vehicles whose distances from the flight start point of the unmanned aerial vehicle are less than a preset distance value as first riding points, using locations of these candidate riding vehicles leaving the geo-fencing corresponding to the autonomous flight route as corresponding final departure points, and generating a candidate flight route for each of the candidate riding vehicles.

In this implementation, the unmanned aerial vehicle rides only one vehicle, and the candidate riding vehicle waits for the unmanned aerial vehicle to ride at its current location. After the unmanned aerial vehicle takes on the vehicle, the vehicle travels along the route.

Exemplarily, another feasible implementation of this step is:

determining first riding points on travelling routes of the candidate riding vehicles, where the first riding point on the travelling route of the candidate riding vehicle may be a location on the travelling route that is closest to the flight start point of the unmanned aerial vehicle; using the locations of these candidate riding vehicles leaving the geo-fencing corresponding to the autonomous flight route as the corresponding final departure points, and generating a candidate flight route for each of the candidate riding vehicles.

In this implementation, the unmanned aerial vehicle rides only one vehicle, and the unmanned aerial vehicle and the candidate riding vehicle go to the first riding point at the same time. If the unmanned aerial vehicle arrives at the first riding point first, the unmanned aerial vehicle waits for the candidate riding vehicle to arrive; if the candidate riding vehicle arrives at the first riding point first, the candidate riding vehicle waits for the unmanned aerial vehicle to arrive. The unmanned aerial vehicle rides the vehicle at the first riding point, and after the unmanned aerial vehicle takes on the vehicle, the vehicle travels along the route.

Exemplarily, another feasible implementation of this step is:

after the candidate riding vehicles are determined, calculating candidate first riding points and candidate final departure points on the travelling routes of the candidate riding vehicles according to the current locations of the candidate riding vehicles; and calculating candidate transfer routes of the unmanned aerial vehicle according to the candidate first riding points and the candidate final departure points on the travelling routes of the candidate riding vehicles; further generating at least one candidate riding flight route according to the candidate first riding points on the travelling routes of the candidate riding vehicles, the candidate transfer routes of the unmanned aerial vehicle and the candidate final departure points on the travelling routes of the candidate riding vehicles; then selecting an optimal route from the at least one candidate riding flight route as the riding flight route for the unmanned aerial vehicle.

In this implementation, the unmanned aerial vehicle may ride one or more vehicles.

Exemplarily, a feasible implementation of this step is:

after the candidate riding vehicles are determined, calculating candidate first riding points and candidate final departure points on the travelling routes of the candidate riding vehicles according to the current locations, travelling routes and travelling speeds of the candidate riding vehicles; and calculating candidate transfer routes of the unmanned aerial vehicle according to the candidate first riding points and the candidate final departure points on the travelling routes of the candidate riding vehicles; further generating at least one candidate riding flight route according to the candidate first riding points on the travelling routes of the candidate riding vehicles, the candidate transfer routes of the unmanned aerial vehicle and the candidate final departure points on the travelling routes of the candidate riding vehicles; then selecting an optimal route from the at least one candidate riding flight route as the riding flight route for the unmanned aerial vehicle.

In this implementation, the unmanned aerial vehicle may ride one or more vehicles. This implementation combines the travelling routes and speeds of the candidate riding vehicles to determine the riding flight route of the unmanned aerial vehicle, in this way, the riding flight route of the unmanned aerial vehicle can be arranged more reasonably, thus enabling the unmanned aerial vehicle to ride the vehicle (s) as much as possible, thereby reducing the distance and time of the unmanned aerial vehicle flying relying on its own power.

Step S103: control the unmanned aerial vehicle to ride at least one of the candidate riding vehicles according to the riding flight route.

After the riding flight route of the unmanned aerial vehicle is determined, control the unmanned aerial vehicle to ride one or more candidate vehicles follow the riding flight route to travel from the flight start point to the flight end point, so as to complete the itinerary by riding the vehicle(s).

In the embodiment of the present application, candidate riding vehicles are determined according to an autonomous flight route of an unmanned aerial vehicle from a flight start point to a flight end point; a riding flight route of the unmanned aerial vehicle is determined according to current locations of the candidate riding vehicles; and the unmanned aerial vehicle is controlled to ride at least one of the candidate riding vehicles to travel from the flight start point to the flight end point according to the riding flight route. The unmanned aerial vehicle rides at least one vehicle when traveling from the flight start point to the flight end point, thus greatly reducing a distance that the unmanned aerial vehicle flies relying on its own power, thereby saving power consumption of the unmanned aerial vehicle and extending a delivery distance of the unmanned aerial vehicle.

Figure 2:
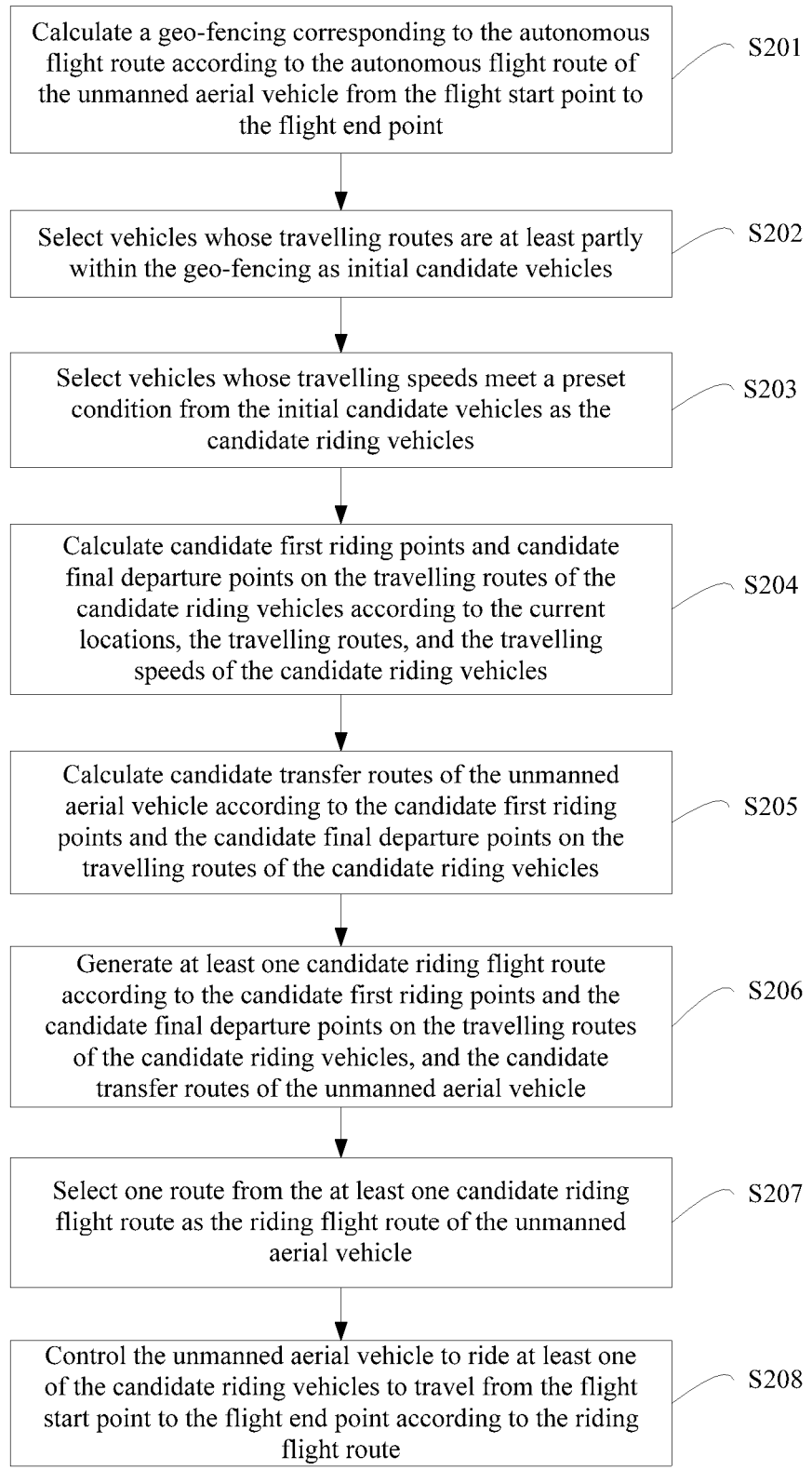
FIG. 2 is a flowchart of an unmanned aerial vehicle riding route processing method provided by an embodiment of the present application.
Figure 3:
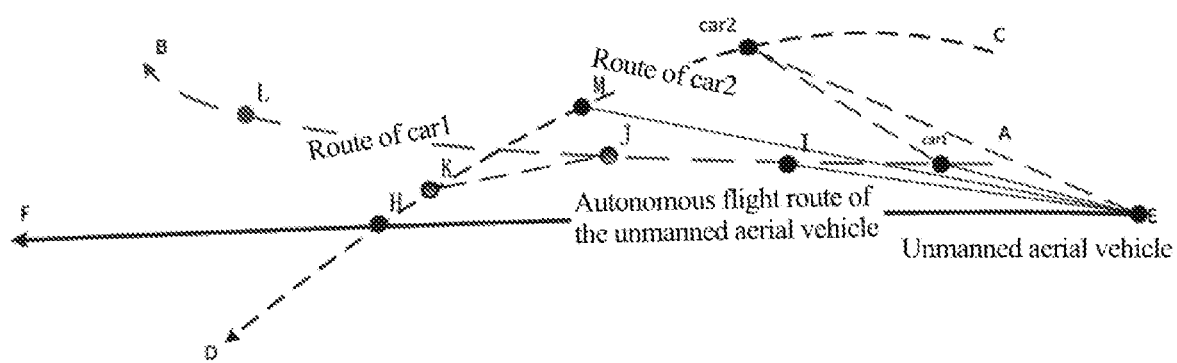
FIG. 3 is a schematic diagram of an unmanned aerial vehicle riding route provided by an embodiment of the present application.

FIG. 2 is a flowchart of an unmanned aerial vehicle riding route processing method provided by an embodiment of the present application; FIG. 3 is a schematic diagram of an unmanned aerial vehicle riding route provided by an embodiment of the present application. On the basis of the above embodiment, in the embodiment, the determining the candidate riding vehicles according to the autonomous flight route of the unmanned aerial vehicle from the flight start point to the flight end point includes: calculating a geo-fencing corresponding to the autonomous flight route according to the autonomous flight route of the unmanned aerial vehicle from the flight start point to the flight end point; acquiring vehicles whose current travelling routes are at least partly within the geo-fencing as initial candidate vehicles; selecting vehicles whose travelling speeds meet a preset condition from the initial candidate vehicles as the candidate riding vehicles. In addition, in the embodiment, a riding flight route of the unmanned aerial vehicle is calculated according to the current locations, travelling routes and travelling speeds of the candidate riding vehicles. Specifically, it can be implemented in the following ways: calculating candidate first riding points and candidate final departure points on the travelling routes of the candidate riding vehicles according to the current locations, the travelling routes and the travelling speeds of the candidate riding vehicles; calculating candidate transfer routes of the unmanned aerial vehicle according to the candidate first riding points and the candidate final departure points on the travelling routes of the candidate riding vehicles; generating at least one candidate riding flight route according to the candidate first riding points and the candidate final departure points on the travelling routes of the candidate riding vehicles, and the candidate transfer routes of the unmanned aerial vehicle. As shown in FIG. 2, the specific steps of the method are as follows.

Step S201: calculate a geo-fencing corresponding to the autonomous flight route according to the autonomous flight route of the unmanned aerial vehicle from the flight start point to the flight end point.

In the embodiment, an area within a specified width on both sides of the autonomous flight route of the unmanned aerial vehicle may be taken as a specific geographic area according to the autonomous flight route of the unmanned aerial vehicle, so as to determine a geo-fencing corresponding to the autonomous flight route of this time. For example, if the specified width is 2 km, the geo-fencing corresponding to the autonomous flight route is an area within a width of 2 km on both sides of the autonomous flight route.

For example, the virtual boundary of the geo-fencing may include a boundary line enclosed by curves (or straight lines) parallel to the autonomous flight route of the unmanned aerial vehicle and separated from the autonomous flight route by a specified width, a line vertical to the autonomous flight route at the flight start point, and a line vertical to the autonomous flight route at the flight end point.

Where the specified width may be calculated according to the autonomous flight route of this time, or the specified width may be set by a technician according to actual application scenarios, which is not specifically limited in the embodiment.

Optionally, for example, the specified width may be a preset scale parameter multiplied by a length of the autonomous flight route, where the preset scale parameter may be set by a technician according to actual application scenarios, which is not specifically limited in the embodiment. For example, the specified width may be one-half of the length of the autonomous flight route of the unmanned aerial vehicle.

Step S202: select vehicles whose travelling routes are at least partly within the geo-fencing as initial candidate vehicles.

In this step, first acquire real-time data of a travelling vehicle capable of carrying an unmanned aerial vehicle, including: an average travelling speed, a current location, a destination location, and a travelling route. Where the travelling route of the vehicle refers to a travelling route from the current location to the destination location of the vehicle.

The current location and the destination location of the vehicle may be latitude and longitude values, or may be POI information determined by the latitude and longitude values.

Optionally, after the current location and the destination location of the vehicle are acquired, the travelling route from the current location to the destination location of the vehicle may be calculated according to the current location and the destination location of the vehicle.

For example, the current point POI and the destination POI of the vehicle may be generated according to the longitude and latitude of the current location and the longitude and latitude of the destination location of the vehicle, and then the travelling route from the current point POI to the destination POI of the vehicle may be calculated.

Optionally, after the travelling routes of the vehicles are determined, the current locations, the destination locations, and the travelling routes of the vehicles may be displayed on an electronic map.

In the embodiment, if the travelling route(s) of the vehicle(s) is not within the geo-fencing at all, it means that the travelling route(s) of the vehicle(s) deviates far from the autonomous flight route of the unmanned aerial vehicle, and these vehicles will not be riding targets(objects) of the unmanned aerial vehicle.

In this step, according to the travelling routes of the vehicles, vehicles whose travelling routes are at least partly within the geo-fencing are selected as the initial candidate vehicles.

Step S203: select vehicles whose travelling speeds meet a preset condition from the initial candidate vehicles as the candidate riding vehicles.

In this step, when selecting the candidate riding vehicles, the preset condition which the travelling speed of the vehicle meets at least includes: an average travelling speed of the vehicle being greater than a first speed threshold.

Where the first speed threshold can be set by a technician according to actual needs, which is not specifically limited in the embodiment.

Further, the selecting the vehicles whose travelling speeds meet the preset condition from the initial candidate vehicles as the candidate riding vehicles may also include:

calculating area travelling directions, area straight-line pathlengths and area actual pathlengths of the initial candidate vehicles in the geo-fencing; calculating estimated travelling times of the initial candidate vehicles in the geo-fencing according to the area actual pathlengths and average travelling speeds of the initial candidate vehicles in the geo-fencing; calculating area linear speeds of the initial candidate vehicles in the geo-fencing according to the estimated travelling times of the initial candidate vehicles in the geo-fencing and the area straight-line pathlengths of the initial candidate vehicles in the geo-fencing; calculating velocity components of the area linear speeds of the initial candidate vehicles along the autonomous flight direction of the unmanned aerial vehicle according to the area travelling directions of the initial candidate vehicles in the geo-fencing; and taking vehicles with the velocity components greater than a second speed threshold as the candidate riding vehicles.

Where the second speed threshold is a product of a preset scale value and an average flight speed of the unmanned aerial vehicle. The preset scale value can be set by a technician according to actual application scenarios and experience, which is not specifically limited in the embodiment.

Specifically, the calculating the area travelling direction, the area straight-line pathlength and the area actual pathlength of the initial candidate vehicle in the geo-fencing may be implemented in the following way.

Determine a direction start point and a direction end point of the initial candidate vehicle within the geo-fencing, where the area travelling direction of the initial candidate vehicle in the geo-fencing is from the direction start point to the direction end point; the area straight-line pathlength is a straight-line length from the direction start point to the direction end point, and the area actual pathlength is an actual travelling length of the initial candidate vehicle along a travelling route from the direction start point to the direction end point.

Where the direction start point is a start point of a part of the travelling route of the initial candidate vehicle which is in the geo-fencing; the direction end point is an end point of the part of the travelling route of the initial candidate vehicle which is in the geo-fencing.

Specifically, according to the current location of the initial candidate vehicle, if the current location of the initial candidate vehicle is in the geo-fencing, the direction start point of the initial candidate vehicle in the geo-fencing is the current location of the initial candidate vehicle; if the current location is not in the geo-fencing, the direction start point of the initial candidate vehicle in the geo-fencing is the first point where the initial candidate vehicle enters the geo-fencing along the travelling route.

According to the destination location of the initial candidate vehicle, if the destination location of the initial candidate vehicle is in the geo-fencing, the direction end point of the initial candidate vehicle in the geo-fencing is the destination location of the initial candidate vehicle; if the destination location is not in the geo-fencing, the direction end point of the initial candidate vehicle in the geo-fencing is the last point where the initial candidate vehicle leaves the geo-fencing along the travelling route.

Further, the estimated travelling time of the initial candidate vehicle in the geo-fencing may be calculated by dividing the area actual pathlength of the initial candidate vehicle in the geo-fencing by the average travelling speed.

According to the estimated travelling time of the initial candidate vehicle in the geo-fencing, the area linear speed of the initial candidate vehicle in the geo-fencing may be calculated by dividing the area straight-line pathlength of the initial candidate vehicle in the geo-fencing by the estimated travel time.

According to the flight start point and the flight end point of the unmanned aerial vehicle, the autonomous flight direction of the unmanned aerial vehicle from the flight start point to the flight end point may be determined; the velocity component of the area linear speed of the initial candidate vehicle along the autonomous flight direction of the unmanned aerial vehicle may be calculated, combining the area travelling direction of the initial candidate vehicle in the geo-fencing.

For example, assuming that the flight start point and the flight end point of the unmanned aerial vehicle are represented by E and F respectively, the autonomous flight direction of the unmanned aerial vehicle is the direction $\overrightarrow{EF}$; assuming that the direction start point and the direction end point of a certain initial candidate vehicle within the geo-fencing are A and B respectively, the direction of the area linear speed of the initial candidate vehicle in the geo-fencing is $\overrightarrow{AB}$, and the component of the area linear velocity of the initial candidate vehicle in the geo-fencing along the direction $\overrightarrow{EF}$ can be calculated, thereby obtaining the velocity component of the area linear speed of the initial candidate vehicle along the autonomous flight direction of the unmanned aerial vehicle.

Further, a vehicle with a velocity component greater than the second speed threshold may be used as a candidate riding vehicle.

Step S204: calculate candidate first riding points and candidate final departure points on the travelling routes of the candidate riding vehicles according to the current locations, the travelling routes, and the travelling speeds of the candidate riding vehicles.

Where the candidate first riding point refers to a location point where the unmanned aerial vehicle directly flies to a vehicle from the flight start point for the first riding of this flight.

The candidate final departure point refers to a location point where the unmanned aerial vehicle flies away from its current riding vehicle and directly flies to the flight end point.

In the embodiment, the calculating the candidate first riding points on the travelling routes of the candidate riding vehicles according to the current locations, the travelling routes, and the travelling speeds of the candidate riding vehicles may be specifically implemented in the following ways.

Calculate the candidate riding points on the travelling routes of the candidate riding vehicles according to the current locations, the travelling routes, and the travelling speeds of the candidate riding vehicles, the unmanned aerial vehicle flying from the flight start point to the candidate riding point whilst the candidate riding vehicles travelling to the corresponding candidate riding points. If there are multiple candidate riding points on a travelling route of a candidate riding vehicle, calculate unmanned aerial vehicle ride-to-fly times corresponding to the multiple candidate riding points, and take a candidate riding point with the shortest unmanned aerial vehicle ride-to-fly time as the candidate first riding point on the travelling route of the candidate riding vehicle.

Where the unmanned aerial vehicle ride-to-fly time refers to a time required for the unmanned aerial vehicle to fly from the flight start point to the candidate riding point.

For example, assuming that from the current moment, a flight time of the unmanned aerial vehicle flying from the flight start point to a certain location point on the travelling route of a certain candidate riding vehicle is tn1, and the travelling time of the candidate riding vehicle travels from the current location to this location point is tn2. If tn1=tn2, this location point is one candidate riding point for the unmanned aerial vehicle to ride this candidate riding vehicle.

In addition, the flight time of the unmanned aerial vehicle flying from the flight start point to a certain location point on the travelling route of a certain candidate riding vehicle may be calculated by dividing the flight distance of the unmanned aerial vehicle to this location point by the average flight speed of the unmanned aerial vehicle.

The travelling time of a candidate riding vehicle travelling from the current location to a certain location point may be obtained by dividing a pathlength of the candidate riding vehicle travelling from the current location to the certain location point by the average travelling speed of the candidate riding vehicle.

Optionally, according to the candidate riding vehicles determined in step S203, unique numbers are assigned to all the candidate riding vehicles, the geo-fencing may be displayed on the electronic map, and travelling routes of the candidate riding vehicles in the geo-fencing may be displayed, where the travelling routes may be marked with the unique numbers of the candidate riding vehicles.

Preferably, after the candidate riding points on the travelling routes of the candidate riding vehicles are calculated according to the current locations, the travelling routes, and the travelling speeds of the candidate riding vehicles, perform a selection to the candidate riding points, which specifically includes: excluding a candidate riding point that is not in the geo-fencing corresponding to the autonomous flight route, and excluding a candidate riding point located at a location where the unmanned aerial vehicle cannot perform riding.

Further, after the candidate riding points on the travelling routes of the candidate riding vehicles are determined, if there are multiple candidate riding points for the unmanned aerial vehicle and a certain candidate riding vehicle, select a candidate riding point with the shortest flight time during which the unmanned aerial vehicle flies from the flight start point to the candidate riding point as the candidate first riding point for the candidate riding vehicle.

Optionally, the candidate first riding points on the travelling routes of the candidate riding vehicles may be displayed on the electronic map and marked with the unique numbers of the candidate riding vehicles.

In this step, the calculating the candidate final departure points on the travelling routes of the candidate riding vehicles according to the current locations, the travelling routes, and the travelling speeds of the candidate riding vehicles may be specifically implemented in the following ways.

Take points closest to the flight end point on road sections where the unmanned aerial vehicle is allowed to fly away on the travelling routes of the candidate riding vehicles as the candidate final departure points.

Specifically, circularly process the candidate riding vehicles, and take the points closest to the flight end point on the road sections where the unmanned aerial vehicle is allowed to fly away on the travelling routes of the candidate riding vehicles as the candidate final departure points on the travelling routes of the candidate riding vehicles.

Optionally, the candidate first riding points on the travelling routes of the candidate riding vehicles may be displayed on the electronic map and marked with the unique numbers of the candidate riding vehicles.

In addition, in the embodiment, according to current weather conditions (including sunny, rainy, snowy, foggy, a wind speed, etc.), the average flight speed of the unmanned aerial vehicle under the same weather conditions can be derived from historical data.

Step S205: calculate candidate transfer routes of the unmanned aerial vehicle according to the candidate first riding points and the candidate final departure points on the travelling routes of the candidate riding vehicles.

In the embodiment, the unmanned aerial vehicle may ride one or more vehicles when traveling from the flight start point to the flight end point.

When traveling from the flight start point to the flight end point, if the number of vehicles which have been ridden is larger, there would be more factors in the midway (for example, the vehicle is travelling too fast or too slow, etc.). In order to improve the effectiveness of the riding route of the unmanned aerial vehicle, the number of vehicles that the unmanned aerial vehicle rides when traveling from the flight start point to the flight end point usually does not exceed a preset riding number. Where the preset riding number may be set by a technician according to actual application scenarios and experience, which is not specifically limited in the embodiment.

Optionally, the preset riding number may be 3, in this case, calculation of the candidate transfer routes of the unmanned aerial vehicle may be performed twice.

In this step, the calculating the candidate transfer routes of the unmanned aerial vehicle according to the candidate first riding points and the candidate final departure points on the travelling routes of the candidate riding vehicles may be specifically implemented in the following ways.

Take candidate riding vehicles whose travelling routes contain the candidate first riding points as candidate transfer objects, calculate first candidate transfer routes corresponding to the candidate first riding points, the first candidate transfer route corresponding to the candidate first riding point referring to a flight route from a first midway departure point on a travelling route corresponding to the candidate first riding point to a first midway riding point on a travelling route of a candidate transfer object; take candidate riding vehicles whose driving routes contain the candidate final departure points on the travelling routes as candidate transfer objects, and calculate second candidate transfer routes corresponding to the first candidate transfer routes according to the first candidate transfer routes, the second candidate transfer route corresponding to the first candidate transfer route referring to a flight route from a second midway departure point on a travelling route corresponding to the first midway riding point of the first candidate transfer route to a second midway riding point on a travelling route of a candidate transfer object.

Specifically, circularly process the candidate riding vehicles whose travelling routes contain the candidate first riding points and calculate the first candidate transfer routes corresponding to the candidate first riding points. Then, circularly process the candidate riding vehicles (including a candidate riding vehicle whose travelling route does not contain the candidate first riding points), and calculate the second candidate transfer routes corresponding to the first candidate transfer routes.

Further, the process of determining the first midway departure point and the first midway riding point of the first candidate transfer route when calculating the first candidate transfer route corresponding to the candidate first riding point is the same as the process of determining the second midway departure point and the second midway riding point of the second candidate transfer route when calculating the second candidate transfer route corresponding to the respective first candidate transfer route, which may be specifically implemented in the following ways.

Determine a directed line segment connected by a first moving point of a first vehicle that the unmanned aerial vehicle will fly away at a first moment and a second moving point of the other second vehicle at time T after the first moment, as the directed line segment of the unmanned aerial vehicle transferring from the first vehicle to the second vehicle.

Where the start point of the directed line segment is the first moving point, the corresponding vehicle of the first moving point is the first vehicle that the unmanned aerial vehicle will fly away. The end point of the directed line segment is the second moving point, and the corresponding vehicle of the second moving point is the second vehicle that the unmanned aerial vehicle will transfer to. The first vehicle is the vehicle currently ridden by the unmanned aerial vehicle, and the second vehicle is the other vehicle that may be used as a transfer object.

These directed line segments meet the following conditions: the unmanned aerial vehicle flies away from the first vehicle from the start point of the directed line segment, flies along the directed line segment, and arrives at the end point of the directed line segment after time T. At this time, the second vehicle just travels to arrive at the end point of the directed line segment, and then the unmanned aerial vehicle may ride the second vehicle.

In this way, the start point and the end point of a directed line segment may be used as a midway departure point and a midway riding point, and the directed line segment may be used as a candidate transfer route.

Where T is a preset time length, which may be calculated according to the average flight speed of the unmanned aerial vehicle, the average travelling speed of the second vehicle, and the travelling route of the second vehicle by using the method in the related art, which will not be repeated in this embodiment.

Specifically, for a group of the first vehicle and the second vehicle, the first moment may start from the moment the unmanned aerial vehicle rides on the first vehicle, that is, an initial state of the start point of the directed line segment is a location point that the unmanned aerial vehicle just rides on the first vehicle. According to the average travelling speeds of the first vehicle and the second vehicle, simulate the changes of the directed line segment between the two vehicles in the future time, and select the directed line segment with the shortest length from the directed line segments which are entire in the geo-fencing as the transfer route for the unmanned aerial vehicle to transfer from the first vehicle to the second vehicle. Where the start point and the end point of the directed line segment are used as the midway departure point and the midway riding point respectively.

If the first vehicle is the vehicle that the unmanned aerial vehicle rides on for the first time during the journey from the flight start point to the flight end point, the directed line segment is the first candidate transfer route corresponding to the candidate first riding point where the unmanned aerial vehicle rides on the first vehicle.

If the first vehicle is the vehicle that the unmanned aerial vehicle transfers for the first time in the journey from the flight start point to the flight destination, the directed line segment is the second candidate transfer route corresponding to the first candidate transfer route along which the unmanned aerial vehicle transfers to the first vehicle.

Step S206: generate at least one candidate riding flight route according to the candidate first riding points and the candidate final departure points on the travelling routes of the candidate riding vehicles, and the candidate transfer routes of the unmanned aerial vehicle.

Constitute the at least one candidate riding flight route according to the candidate first riding points and the candidate final departure points on the travelling routes of the candidate riding vehicles, and the candidate transfer routes of the unmanned aerial vehicle calculated from above step.

Specifically, constitute the at least one candidate riding flight route according to the candidate first riding points, the first candidate transfer routes corresponding to the candidate first riding points, the second candidate transfer routes corresponding to the first candidate transfer routes, and the candidate final departure points calculated from the above step. Where the candidate riding flight route may not include the first candidate transfer route, or may not include the second candidate transfer route.

For example, as shown in FIG. 3, E and F represent the flight start point and the flight end point of the unmanned aerial vehicle, respectively, the route AB represents the travelling route of the candidate riding vehicle car1 in the geo-fencing, and the route CD represents the travelling route of the candidate riding vehicle Car2 in the geo-fencing, I is the candidate first riding point on the travelling route of the candidate riding vehicle car1, L is the candidate final departure point on the travelling route of the candidate riding vehicle car1, M is the candidate first riding point on the travelling route of the candidate riding vehicle Car2, H is the candidate final departure point on the travelling route of the candidate riding vehicle Car2. The directed line segment ($\overrightarrow{JK}$) is the first candidate transfer route corresponding to the candidate first riding point I on the travelling route of car1. Then, the candidate riding flight route of the unmanned aerial vehicle includes at least:

a candidate riding flight route 1 (it can be represented by "EI-JK-HF"): the unmanned aerial vehicle flies along the direction of EI from the flight start point E. When the unmanned aerial vehicle arrives at the point I, car1 just arrives at the point I, and the unmanned aerial vehicle rides on car1. When car1 arrives at the point J, the unmanned aerial vehicle flies away from car1, and when the unmanned aerial vehicle flies along the direction of JK to arrive at point K, car2 just arrives at the point K, the unmanned aerial vehicle transfers to car2 at the point K. When car2 arrives at the point H, the unmanned aerial vehicle flies away from car2 along the direction of HF to the end point F;

a candidate riding flight route 2 (it can be represented by "EI-LF"): the unmanned aerial vehicle flies along the direction of EI from the flight start point E. When the unmanned aerial vehicle arrives at the point I, car1 just arrives at the point I, and the unmanned aerial vehicle rides on car1. When car1 arrives at the point L, the unmanned aerial vehicle flies away from car1 along the direction of LF to the end point F; and a candidate riding flight route 3 (it can be represented by "EM-HF"): the unmanned aerial vehicle flies along the direction of EM from the flight start point E. When the unmanned aerial vehicle arrives at the point M, car2 just arrives at the point M, and the unmanned aerial vehicle rides on car2. When car2 arrives at the point H, the unmanned aerial vehicle flies away from car2 along the direction of LF to the end point F.

Step S207: select one route from the at least one candidate riding flight route as the riding flight route of the unmanned aerial vehicle.

In the embodiment, after the at least one candidate riding flight route is generated according to the candidate first riding points and the candidate final departure points on the travelling routes of the candidate riding vehicles, and the candidate transfer routes of the unmanned aerial vehicle, select one route from the at least one candidate riding flight route as the riding flight route of the unmanned aerial vehicle.

Specifically, calculate a total travelling time of the at least one candidate riding flight route according to the average flight speed of the unmanned aerial vehicle and the average travelling speeds of the candidate riding vehicles; and exclude a candidate riding flight route whose total travelling time is greater than a limited flight time.

Where the total travelling time of the candidate riding flight route includes the sum of the flight time of the unmanned aerial vehicle and the time that the unmanned aerial vehicle rides the vehicle. The total travelling time may be calculated according to the candidate riding flight route, the average flight speed of the unmanned aerial vehicle, and the average travelling speed of the vehicle that the unmanned aerial vehicle rides.

The limited flight time may be calculated as follows.

Calculate the remaining time between the current time and the estimated time of the unmanned aerial vehicle arriving at the flight end point; acquire the maximum total time for the unmanned aerial vehicle travelling from the flight start point to the flight end point this time; and use the minimum of the remaining time and the maximum total time as the limited flight time of the unmanned aerial vehicle from the start point to the flight end point for this time.

Where the maximum total time for the unmanned aerial vehicle travelling from the start point to the flight end point this time may be set by a technician according to requirements of subsequent flight missions of the unmanned aerial vehicle, etc., which is not specifically limited in the embodiment.

Further, after the candidate riding flight route whose total travelling time is greater than the limited flight time is excluded, the method further includes: using the following formula to calculate the final index value of the at least one candidate riding flight route: $Z=aX+bY$; and taking the candidate riding flight route with the smallest final index value as the riding flight route of the unmanned aerial vehicle.

Where Z is the final index value of the candidate riding flight route, X is the total travelling time of the candidate riding flight route, Y is a flight pathlength or a flight time of the unmanned aerial vehicle in the candidate riding flight route, and a and b are preset weight values, a$>$=0, b$>$=0.

Optionally, after the riding flight route of the unmanned aerial vehicle is determined, the riding flight route of the unmanned aerial vehicle may be displayed on the electronic map.

Step S208: control the unmanned aerial vehicle to ride at least one of the candidate riding vehicles to travel from the flight start point to the flight end point according to the riding flight route.

After the riding flight route of the unmanned aerial vehicle is determined, control the unmanned aerial vehicle to follow the riding flight route to ride one or more candidate riding vehicles, to travel from the flight start point to the flight end point, so that the unmanned aerial vehicle may ride the vehicle(s) to complete the trip.

In the embodiment, during the process of controlling the unmanned aerial vehicle to travel according to the riding flight route, acquire a travelling speed and a location of a next target vehicle that the unmanned aerial vehicle will ride in real time every preset time period; update a location of a riding point where the unmanned aerial vehicle rides the target vehicle according to the average flight speed and the location of the unmanned aerial vehicle, and control the unmanned aerial vehicle to ride the target vehicle according to the updated location of the riding point.

Further, if an offset distance between the updated location of the riding point and a pre-updated location of the riding point is greater than a preset offset value, use the current location of the unmanned aerial vehicle as a new flight start point. Employ the method provided in the embodiment, use the straight line from the current location to the flight end point as the new autonomous flight route of the unmanned aerial vehicle, update the geo-fencing according to the new autonomous flight route, and recalculate the riding flight route of the unmanned aerial vehicle.

In the embodiment of the present application, candidate riding vehicles are determined according to an autonomous flight route of an unmanned aerial vehicle from a flight start point to a flight end point; a riding flight route of the unmanned aerial vehicle is calculated according to current locations, travelling routes and travelling speeds of the candidate riding vehicles; and the unmanned aerial vehicle is controlled to ride at least one of the candidate riding vehicle from the start point to the flight end point according to the riding flight route. The unmanned aerial vehicle rides at least one vehicle when traveling from the flight start point to the flight end point, thus greatly reducing a distance that the unmanned aerial vehicle flies relying on its own power, thereby saving power consumption of the unmanned aerial vehicle and extending a delivery distance of the unmanned aerial vehicle.

Figure 4:
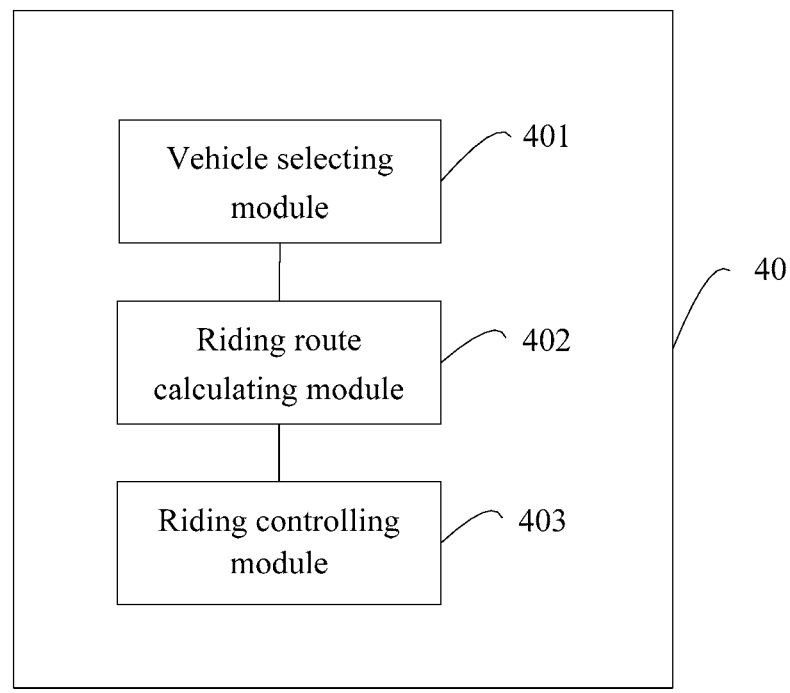
FIG. 4 is a schematic structural diagram of an unmanned aerial vehicle riding route processing apparatus provided by an embodiment of the present application.

FIG. 4 is a schematic structural diagram of an unmanned aerial vehicle riding route processing apparatus provided by an embodiment of the present application. The unmanned aerial vehicle riding route processing apparatus provided in the embodiment of the present application may execute the processing flow provided in the embodiment of the unmanned aerial vehicle riding route processing method. As shown in FIG. 4, the unmanned aerial vehicle riding route processing apparatus 40 includes: a vehicle selecting module 401, a riding route calculating module 402 and a riding controlling module 403.

Specifically, the vehicle selecting module 401 is configured to determine candidate riding vehicles according to an autonomous flight route of an unmanned aerial vehicle from a flight start point to a flight end point.

The riding route calculating module 402 is configured to determine a riding flight route of the unmanned aerial vehicle according to current locations of the candidate riding vehicles.

The riding controlling module 403 is configured to control, according to the riding flight route, the unmanned aerial vehicle to ride at least one of the candidate riding vehicles to travel from the flight start point to the flight end point.

The apparatus provided in the embodiment of the present application may be specifically configured to execute the method embodiment provided in the above method embodiments, and the specific functions are not repeated herein.

In the embodiment of the present application, candidate riding vehicles are determined according to an autonomous flight route of an unmanned aerial vehicle from a flight start point to a flight end point; a riding flight route of the unmanned aerial vehicle is determined according to current locations of the candidate riding vehicles; and the unmanned aerial vehicle is controlled to ride at least one of the candidate riding vehicles to travel from the flight start point to the flight end point according to the riding flight route. The unmanned aerial vehicle rides at least one vehicle when traveling from the flight start point to the flight end point, thus greatly reducing a distance that the unmanned aerial vehicle flies relying on its own power, thereby saving power consumption of the unmanned aerial vehicle and extending a delivery distance of the unmanned aerial vehicle.

On the basis of the above embodiment, in the embodiment, the vehicle selecting module is further configured to:
calculate a geo-fencing corresponding to the autonomous flight route according to the autonomous flight route of the unmanned aerial vehicle from the flight start point to the flight end point; select vehicles whose travelling routes are at least partly within the geo-fencing as initial candidate vehicles; and select vehicles whose travelling speeds meet a preset condition from the initial candidate vehicles as the candidate riding vehicles.

Optionally, the vehicle selecting module is further configured to:
calculate area travelling directions, area straight-line pathlengths and area actual pathlengths of the initial candidate vehicles in the geo-fencing; calculate estimated travelling times of the initial candidate vehicles in the geo-fencing according to the area actual pathlengths and average travelling speeds of the initial candidate vehicles in the geo-fencing; calculate area linear speeds of the initial candidate vehicles in the geo-fencing according to the estimated travelling times of the initial candidate vehicles in the geo-fencing and the area straight-line pathlengths of the initial candidate vehicles in the geo-fencing; calculate velocity components of the area linear speeds of the initial candidate vehicles along the autonomous flight direction of the unmanned aerial vehicle according to the area travelling directions of the initial candidate vehicles in the geo-fencing; and take vehicles with the velocity components greater than a second speed threshold as the candidate riding vehicles.

Optionally, the vehicle selecting module is further configured to:
determine direction start points and direction end points of the initial candidate vehicles within the geo-fencing, wherein the area travelling direction of the initial candidate vehicle in the geo-fencing is from the direction start point to the direction end point, the area straight-line pathlength is a straight-line length from the direction start point to the direction end point, and the area actual pathlength is an actual travelling length of the initial candidate vehicle along a travelling route from the direction start point to the direction end point.

Optionally, the direction start point is a start point of a part of the travelling route of the initial candidate vehicle which is in the geo-fencing; the direction end point is an end point of the part of the travelling route of the initial candidate vehicle which is in the geo-fencing.

Optionally, the second speed threshold is a product of a preset scale value and the average flight speed of the unmanned aerial vehicle.

Optionally, the riding route calculating module is further configured to:
determine the riding flight route of the unmanned aerial vehicle according to the current locations, the travelling routes and travelling speeds of the candidate riding vehicles.

Optionally, the riding route calculating module is further configured to:
calculate candidate first riding points and candidate final departure points on the travelling routes of the candidate riding vehicles according to the current locations, the travelling routes and the travelling speeds of the candidate riding vehicles; calculate candidate transfer routes of the unmanned aerial vehicle according to the candidate first riding points and the candidate final departure points on the travelling routes of the candidate riding vehicles; generate at least one candidate riding flight route according to the candidate first riding points and the candidate final departure points on the travelling routes of the candidate riding vehicles and the candidate transfer routes of the unmanned aerial vehicle.

Optionally, the riding route calculating module is further configured to:
take candidate riding vehicles whose travelling routes contain the candidate first riding points as candidate transfer objects, calculate first candidate transfer routes corresponding to the candidate first riding points, the first candidate transfer route corresponding to the candidate first riding point referring to a flight route from a first midway departure point on a travelling route corresponding to the candidate first riding point to a first midway riding point on a travelling route of a candidate transfer object; and take candidate riding vehicles whose travelling routes contain the candidate final departure points as candidate transfer objects, calculating second candidate transfer routes corresponding to the first candidate transfer routes according to the first candidate transfer routes, the second candidate transfer route corresponding to the first candidate transfer route referring to a flight route from a second midway departure point on a travelling route corresponding to the first midway riding point of the first candidate transfer route to a second midway riding point on a travelling route of a candidate transfer object.

Optionally, the riding route calculating module is further configured to:
calculate the candidate riding points on the travelling routes of the candidate riding vehicles according to the current locations, the travelling routes, and the travelling speeds of the candidate riding vehicles, the unmanned aerial vehicle flying from the flight start point to the candidate riding point whilst the candidate riding vehicles travelling to the corresponding candidate riding points; and if there are multiple candidate riding points on a travelling route of a candidate riding vehicle, calculate unmanned aerial vehicle ride-to-fly times corresponding to the multiple candidate riding points, and take a candidate riding point with a shortest unmanned aerial vehicle ride-to-fly time as the candidate first riding point on the travelling route of the candidate riding vehicle; wherein the unmanned aerial vehicle ride-to-fly time refers to a time required for the unmanned aerial vehicle to fly from the flight start point to the candidate riding point.

Optionally, the riding route calculating module is further configured to:
exclude a candidate riding point that is not in the geo-fencing corresponding to the autonomous flight route, and exclude a candidate riding point located at a location where the unmanned aerial vehicle cannot perform riding.

Optionally, the riding route calculating module is further configured to:
take points closest to the flight end point on road sections where the unmanned aerial vehicle is allowed to fly away on the travelling routes of the candidate riding vehicles as the candidate final departure points.

Optionally, the riding route calculating module is further configured to:
calculate a total travelling time of the at least one candidate riding flight route according to the average flight speed of the unmanned aerial vehicle and the average travelling speeds of the candidate riding vehicles; and exclude a candidate riding flight route whose total travelling time is greater than a limited flight time.

Optionally, the riding route calculating module is further configured to:
use the following formula to calculate a final index value of the at least one candidate riding flight route: $Z=aX+bY$, where Z is the final index value of the candidate riding flight route, X is the total travelling time of the candidate riding flight route, Y is a flight pathlength or a flight time of the unmanned aerial vehicle in the candidate riding flight route, and a and b are preset weight values, $a>=0$, $b>=0$; and take a candidate riding flight route with the smallest final index value as the riding flight route of the unmanned aerial vehicle.

Optionally, the riding controlling module is further configured to:
acquire a travelling speed and a location of a next target vehicle that the unmanned aerial vehicle will ride every preset time period; update a location of a riding point where the unmanned aerial vehicle rides the target vehicle according to an average flight speed and a location of the unmanned aerial vehicle, and control the unmanned aerial vehicle to ride the target vehicle according to the updated location of the riding point.

The apparatus provided in the embodiment of the present application may be specifically configured to execute the method embodiment provided in the above embodiment, and the specific functions are not repeated herein.

In the embodiment of the present application, candidate riding vehicles are determined according to an autonomous flight route of an unmanned aerial vehicle from a flight start point to a flight end point; a riding flight route of the unmanned aerial vehicle is calculated according to current locations, travelling routes and travelling speeds of the candidate riding vehicles; and the unmanned aerial vehicle is controlled to ride at least one of the candidate riding vehicles to travel from the start point to the flight end point according to the riding flight route. The unmanned aerial vehicle rides at least one vehicle when traveling from the flight start point to the flight end point, thus greatly reducing a distance that the unmanned aerial vehicle flies relying on its own power, thereby saving power consumption of the unmanned aerial vehicle and extending a delivery distance of the unmanned aerial vehicle.

Figure 5:
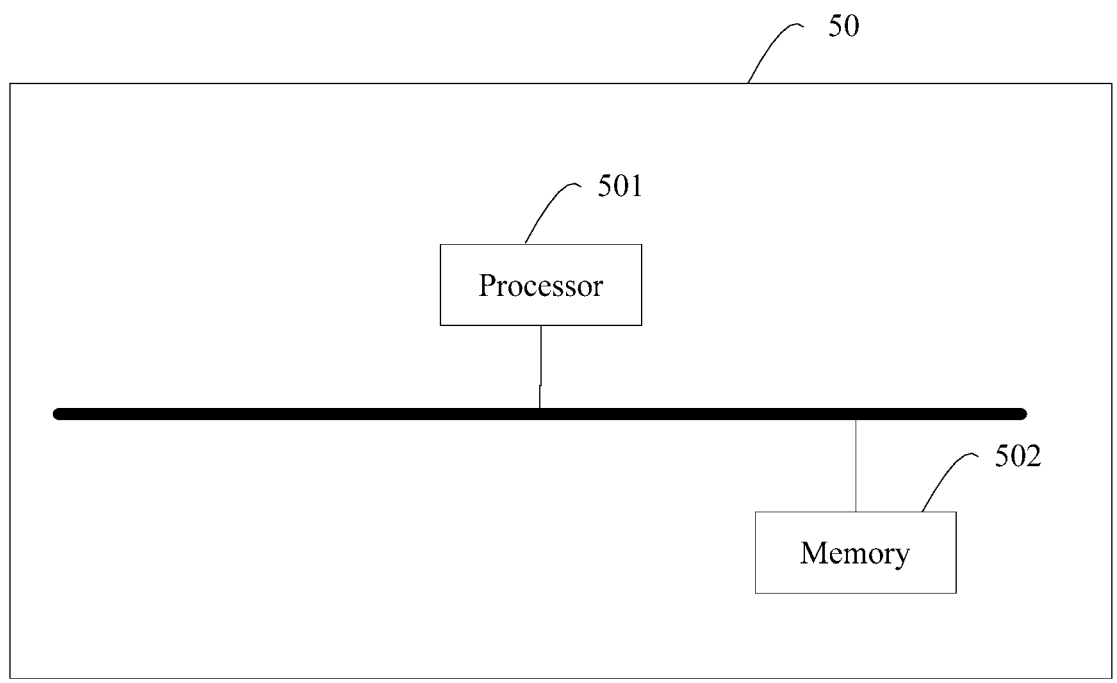
FIG. 5 is a schematic structural diagram of an unmanned aerial vehicle riding route processing device provided by an embodiment of the present application.

FIG. 5 is a schematic structural diagram of an unmanned aerial vehicle riding route processing device provided by an embodiment of the present application. As shown in FIG. 5, the unmanned aerial vehicle riding route processing device 50 includes a processor 501, a memory 502, and a computer program stored in the memory 502 and executed by the processor 501.

When the processor 501 executes the computer program stored on the memory 502, the unmanned aerial vehicle riding route processing method provided by any of the above method embodiments is implemented.

In the embodiment of the present application, candidate riding vehicles are determined according to an autonomous flight route of an unmanned aerial vehicle from a flight start point to a flight end point; a riding flight route of the unmanned aerial vehicle is determined according to the current location of each candidate riding vehicle; and the unmanned aerial vehicle is controlled to ride at least one of the candidate riding vehicles to travel from the flight start point to the flight end point according to the riding flight route. The unmanned aerial vehicle rides at least one vehicle when traveling from the flight start point to the flight end point, thus greatly reducing a distance that the unmanned aerial vehicle flies relying on its own power, thereby saving power consumption of the unmanned aerial vehicle and extending a delivery distance of the unmanned aerial vehicle.

In addition, an embodiment of the present application also provides a computer-readable storage medium that stores a computer program, and when the computer program is executed by a processor, the unmanned aerial vehicle riding route processing method provided by any of the above method embodiments is implemented.

In the several embodiments provided by the present application, it should be understood that the disclosed apparatus and method can be implemented in other ways. For example, the apparatus embodiments described above are only illustrative. For example, the division of the units is only a logical function division, and there may be other divisions in actual implementations, for example, multiple units or components may be combined or integrated into another system, or some features can be ignored or not implemented. In addition, the displayed or discussed mutual coupling or direct coupling or communication connection may be through some interfaces, the indirect coupling or communication connection between the apparatuses or units may be in electrical, mechanical or other forms.

The units described as separate components may or may not be physically separated, and the components displayed as units may or may not be physical units, that is, they may be located in one place, or distributed on multiple network units. Some or all of the units may be selected according to actual needs to realize the objective of the solution of the embodiment.

In addition, each functional unit in the various embodiments of the present application may be integrated into one processing unit, or may exist independently in physical, or two or more units may be integrated into one unit. The above integrated unit may be implemented in the form of hardware, or in the form of hardware with software functional units.

The above integrated unit implemented in the form of a software functional unit may be stored in a computer readable storage medium. The software functional unit is stored in a storage medium and includes several instructions to cause a computer device (which may be a personal computer, a server, or a network device, etc.) or a processor to execute part of the steps of the method described in the various embodiments of the present application. The storage medium includes a U disk, a mobile hard disk, a read-only memory (ROM), a random access memory (RAM), a magnetic disk or an optical disk and other mediums that can store program codes.

Those skilled in the art may clearly understand that, for the convenience and conciseness of the description, the above division of the functional modules is only used as an example for explanation. In practical applications, the above functions may be allocated to different functional modules for completion as required; that is, the internal structure of the apparatus is divided into different functional modules to complete all or part of the functions described above. For the specific working process of the apparatus described above, reference may be made to the corresponding process in the above method embodiments, which will be not repeated here.

After considering the specification and practicing the application disclosed herein, those skilled in the art will easily think of other implementations of the present application. The present application is intended to cover any variations, uses, or adaptive changes of the present application. These variations, uses, or adaptive changes follow the general principles of the present application and include common knowledge or conventional technical means in the technical field that are not disclosed by the present application. The specification and the embodiments are only regarded as illustrative, and the true scope and spirit of the present application are indicated by the following claims.

It should be understood that the present application is not limited to the precise structure that has been described above and shown in the drawings, and various modifications and changes may be made without departing from the scope thereof. The scope of the present application is only limited by the appended claims.

What is claimed is:

1. An unmanned aerial vehicle riding route processing method, comprising:
   determining candidate riding vehicles according to an autonomous flight route of an unmanned aerial vehicle from a flight start point to a flight end point;
   determining a riding flight route of the unmanned aerial vehicle according to current locations of the candidate riding vehicles; and
   controlling the unmanned aerial vehicle to ride at least one of the candidate riding vehicles according to the riding flight route,
   wherein determining the riding flight route of the unmanned aerial vehicle comprises:
   determining the riding flight route of the unmanned aerial vehicle according to the current locations, travelling routes and travelling speeds of the candidate riding vehicles;
   wherein determining the riding flight route of the unmanned aerial vehicle according to the current locations, the travelling routes and the travelling speeds of the candidate riding vehicles comprises:
calculating candidate first riding points and candidate final departure points on the travelling routes of the candidate riding vehicles according to the current locations, the travelling routes and the travelling speeds of the candidate riding vehicles;
calculating candidate transfer routes of the unmanned aerial vehicle according to the candidate first riding points and the candidate final departure points on the travelling routes of the candidate riding vehicles; and
generating at least one candidate riding flight route according to the candidate first riding points and the candidate final departure points on the travelling routes of the candidate riding vehicles and the candidate transfer routes of the unmanned aerial vehicle.

2. The method according to claim 1, wherein determining the candidate riding vehicles according to the autonomous flight route of the unmanned aerial vehicle from the flight start point to the flight end point comprises:
calculating a geo-fencing corresponding to the autonomous flight route according to the autonomous flight route of the unmanned aerial vehicle from the flight start point to the flight end point, wherein the geo-fencing is an area within a specified width on both sides of the autonomous flight route of the unmanned aerial vehicle;
selecting vehicles whose travelling routes are at least partly within the geo-fencing as initial candidate vehicles; and
selecting vehicles whose average travelling speeds are greater than a first speed threshold from the initial candidate vehicles as the candidate riding vehicles, wherein the average travelling speeds are average travelling speeds of the initial candidate vehicles in the geo-fencing.

3. The method according to claim 2, wherein selecting the vehicles whose average travelling speeds are greater than from the first speed threshold from the initial candidate vehicles as the candidate riding vehicles comprises:
calculating area travelling directions, area straight-line pathlengths and area actual pathlengths of the initial candidate vehicles in the geo-fencing, wherein the area travelling direction is a direction of an initial candidate vehicle from a direction start point to a direction end point within the geo-fencing;
calculating estimated travelling times of the initial candidate vehicles in the geo-fencing according to the area actual pathlengths and average travelling speeds of the initial candidate vehicles in the geo-fencing;
calculating area linear speeds of the initial candidate vehicles in the geo-fencing according to the estimated travelling times of the initial candidate vehicles in the geo-fencing and the area straight-line pathlengths of the initial candidate vehicles in the geo-fencing, wherein the area linear speed is a speed of the initial candidate vehicle from the direction start point to the direction end point within the geo-fencing;
calculating velocity components of the area linear speeds of the initial candidate vehicles along an autonomous flight direction of the unmanned aerial vehicle according to the area travelling directions of the initial candidate vehicles in the geo-fencing; and
taking vehicles with the velocity components greater than a second speed threshold as the candidate riding vehicles.

4. The method according to claim 3, wherein calculating the area travelling directions, the area straight-line pathlengths and the area actual pathlengths of the initial candidate vehicles in the geo-fencing comprises:
determining direction start points and direction endpoints of the initial candidate vehicles within the geo-fencing, wherein the direction start point is a start point of a part of a travelling route of the initial candidate vehicle which is in the geo-fencing, the direction end point is an end point of the part of the travelling route of the initial candidate vehicle which is in the geo-fencing, the area travelling direction of the initial candidate vehicle in the geo-fencing is from the direction start point to the direction endpoint, the area straight-line pathlength is a straight-line length from the direction start point to the direction end point, and the area actual pathlength is an actual travelling length of the initial candidate vehicle along the travelling route from the direction start point to the direction end point.

5. The method according to claim 3, wherein the second speed threshold is a product of a preset scale value and an average flight speed of the unmanned aerial vehicle, wherein the average flight speed is an average flight speed of the unmanned aerial vehicle under same weather conditions derived from historical data according to current weather conditions.

6. The method according to claim 1, wherein calculating the candidate transfer routes of the unmanned aerial vehicle according to the candidate first riding points and the candidate final departure points on the travelling routes of the candidate riding vehicles comprises:
taking candidate riding vehicles whose travelling routes contain the candidate first riding points as candidate transfer objects, calculating first candidate transfer routes corresponding to the candidate first riding points, the first candidate transfer route corresponding to the candidate first riding point referring to a flight route from a first midway departure point on a travelling route corresponding to the candidate first riding point to a first midway riding point on a travelling route of a candidate transfer object; and
taking candidate riding vehicles whose travelling routes contain the candidate final departure points as candidate transfer objects, calculating second candidate transfer routes corresponding to the first candidate transfer routes according to the first candidate transfer routes, the second candidate transfer route corresponding to the first candidate transfer route referring to a flight route from a second midway departure point on a travelling route corresponding to the first midway riding point of the first candidate transfer route to a second midway riding point on a travelling route of a candidate transfer object.

7. The method according to claim 1, wherein calculating the candidate first riding points on the travelling routes of the candidate riding vehicles according to the current locations, the travelling routes and the travelling speeds of the candidate riding vehicles comprises:
calculating the candidate riding points on the travelling routes of the candidate riding vehicles according to the current locations, the travelling routes, and the travelling speeds of the candidate riding vehicles, the unmanned aerial vehicle flying from the flight start point to the candidate riding point whilst the candidate riding vehicles travelling to corresponding candidate riding points; and when there are multiple candidate riding points on a travelling route of a candidate riding vehicle, calculating unmanned aerial vehicle ride-to-fly times corresponding to the multiple candidate riding points, and taking a candidate riding point with a shortest unmanned aerial vehicle ride-to-fly time as the candidate first riding point on the travelling route of the candidate riding vehicle;

wherein the unmanned aerial vehicle ride-to-fly time refers to a time required for the unmanned aerial vehicle to fly from the flight start point to the candidate riding point.

8. The method according to claim 1, wherein calculating the candidate final departure points on the travelling routes of the candidate riding vehicles according to the current locations, the travelling routes and the travelling speeds of the candidate riding vehicles comprises:

taking points closest to the flight end point on road sections where the unmanned aerial vehicle is allowed to fly away on the travelling routes of the candidate riding vehicles as the candidate final departure points.

9. The method according to claim 1, wherein controlling the unmanned aerial vehicle to ride at least one of the candidate riding vehicles according to the riding flight route comprises:

acquiring a travelling speed and a location of a next vehicle that the unmanned aerial vehicle will ride every preset time period;

updating a location of a riding point where the unmanned aerial vehicle rides the next vehicle according to an average flight speed and a location of the unmanned aerial vehicle; and controlling the unmanned aerial vehicle to ride the next vehicle according to the updated location of the riding point.

10. An unmanned aerial vehicle riding route processing device, comprising:

a memory, a processor, and a computer program stored in the memory and executed by the processor, when the processor executes the computer program, the processor is caused to:

determine candidate riding vehicles according to an autonomous flight route of an unmanned aerial vehicle from a flight start point to a flight end point;

determine a riding flight route of the unmanned aerial vehicle according to current locations of the candidate riding vehicles; and control the unmanned aerial vehicle to ride at least one of the candidate riding vehicles according to the riding flight route, wherein the processor is caused to determine the riding flight route of the unmanned aerial vehicle according to the current locations, travelling routes and travelling speeds of the candidate riding vehicles, wherein the processor is caused to:

calculate candidate first riding points and candidate final departure points on the travelling routes of the candidate riding vehicles according to the current locations, the travelling routes and the travelling speeds of the candidate riding vehicles;

calculate candidate transfer routes of the unmanned aerial vehicle according to the candidate first riding points and the candidate final departure points on the travelling routes of the candidate riding vehicles; and generate at least one candidate riding flight route according to the candidate first riding points and the candidate final departure points on the travelling routes of the candidate riding vehicles and the candidate transfer routes of the unmanned aerial vehicle.

11. The unmanned aerial vehicle riding route processing device according to claim 10, wherein the processor is caused to:

calculate a geo-fencing corresponding to the autonomous flight route according to the autonomous flight route of the unmanned aerial vehicle from the flight start point to the flight end point, wherein the geo-fencing is an area within a specified width on both sides of the autonomous flight route of the unmanned aerial vehicle;

select vehicles whose travelling routes are at least partly within the geo-fencing as initial candidate vehicles; and select vehicles whose average travelling speeds are greater than a first speed threshold from the initial candidate vehicles as the candidate riding vehicles, wherein the average travelling speeds are average travelling speeds of the initial candidate vehicles in the geo-fencing.

12. The unmanned aerial vehicle riding route processing device according to claim 11, wherein the processor is caused to:

calculate area travelling directions, area straight-line pathlengths and area actual pathlengths of the initial candidate vehicles in the geo-fencing, wherein the area travelling direction is a direction of an initial candidate vehicle from a direction start point to a direction end point within the geo-fencing;

calculate estimated travelling times of the initial candidate vehicles in the geo-fencing according to the area actual pathlengths and average travelling speeds of the initial candidate vehicles in the geo-fencing;

calculate area linear speeds of the initial candidate vehicles in the geo-fencing according to the estimated travelling times of the initial candidate vehicles in the geo-fencing and the area straight-line pathlengths of the initial candidate vehicles in the geo-fencing, wherein the area linear speed is a speed of the initial candidate vehicle from the direction start point to the direction end point within the geo-fencing;

calculate velocity components of the area linear speeds of the initial candidate vehicles along an autonomous flight direction of the unmanned aerial vehicle according to the area travelling directions of the initial candidate vehicles in the geo-fencing; and take vehicles with the velocity components greater than a second speed threshold as the candidate riding vehicles.

13. The unmanned aerial vehicle riding route processing device according to claim 12, wherein the processor is caused to:

determine direction start points and direction end points of the initial candidate vehicles within the geo-fencing, wherein the direction start point is a start point of a part of a travelling route of the initial candidate vehicle which is in the geo-fencing, the direction end point is an end point of the part of the travelling route of the initial candidate vehicle which is in the geo-fencing, the area travelling direction of the initial candidate vehicle in the geo-fencing is from the direction start point to the direction endpoint, the area straight-line pathlength is a straight-line length from the direction start point to the direction end point, and the area actual pathlength is an actual travelling length of the initial candidate vehicle along the travelling route from the direction start point to the direction end point.

14. The unmanned aerial vehicle riding route processing device according to claim 10, wherein the processor is caused to:
- acquire a travelling speed and a location of a next vehicle that the unmanned aerial vehicle will ride every preset time period;
- update a location of a riding point where the unmanned aerial vehicle rides the next vehicle according to an average flight speed and a location of the unmanned aerial vehicle; and
- control the unmanned aerial vehicle to ride the next vehicle according to the updated location of the riding point.

15. A non-transitory computer-readable storage medium, having a computer program stored thereon, when the computer program is executed by a processor, the following steps are implemented:
- determining candidate riding vehicles according to an autonomous flight route of an unmanned aerial vehicle from a flight start point to a flight end point;
- determining a riding flight route of the unmanned aerial vehicle according to current locations of the candidate riding vehicles; and
- controlling the unmanned aerial vehicle to ride at least one of the candidate riding vehicles according to the riding flight route,
wherein determining the riding flight route of the unmanned aerial vehicle comprise determining the riding flight route of the unmanned aerial vehicle according to the current locations, travelling routes and travelling speeds of the candidate riding vehicles,
wherein determining the riding flight route of the unmanned aerial vehicle according to the current locations, travelling routes and travelling speeds of the candidate riding vehicles comprises:
- calculating candidate first riding points and candidate final departure points on the travelling routes of the candidate riding vehicles according to the current locations, the travelling routes and the travelling speeds of the candidate riding vehicles;
- calculating candidate transfer routes of the unmanned aerial vehicle according to the candidate first riding points and the candidate final departure points on the travelling routes of the candidate riding vehicles; and
- generating at least one candidate riding flight route according to the candidate first riding points and the candidate final departure points on the travelling routes of the candidate riding vehicles and the candidate transfer routes of the unmanned aerial vehicle.

\* \* \* \* \*